UNITED STATES PATENT OFFICE.

FRANK B. ATWOOD, OF LOWELL, MASSACHUSETTS, AND ABM. ELSTON, OF PORT JERVIS, NEW YORK.

IMPROVED COMPOSITION FOR RAZOR-STROPS.

Specification forming part of Letters Patent No. 51,909, dated January 9, 1866.

*To all whom it may concern:*

Be it known that we, FRANK B. ATWOOD, of Lowell, in the county of Middlesex and State of Massachusetts, and ABRAHAM ELSTON, of Port Jervis, in the county of Orange and State of New York, have invented a new and Improved Composition for Razor-Strops; and we do hereby declare that the following is a full, clear, and exact description thereof, which will enable others skilled in the art to fully understand and make use of the same.

This invention relates to a paste which, when applied to a strop for sharpening razors, or other sharp-edged instruments for surgical or other purposes, considerably facilitates the operation of sharpening, and assists in producing a sharp and fine edge in a short time and with little exertion.

Our composition is made of *limatura ferri*, or iron filings, emery, and tallow, to which some neat's-foot oil may be added, in order to give to the paste the desired consistency and prevent it from getting hard.

The proportion in which we mix our paste together is about as follows: *Limatura ferri*, two and one-half ounces; emery, five pounds; tallow, two and one-half pounds; neat's-foot oil, one and one-half pound; and for the purpose of flavoring the paste some lavender or other perfume may be added, to suit the taste of customers.

The tallow is melted at a gentle heat. Then the neat's-foot oil is added, and the emery is stirred in, and, finally, the *limatura ferri* is sprinkled over it, and the whole mass worked well until it is thoroughly mixed. When cold it is ready to be put up in tin-foil, or in boxes, as may be most convenient.

It is applied to the strop by rubbing with a flat stick or with the finger until the surface thereof is covered evenly, and the razor or other instrument is sharpened thereon in the ordinary manner.

By the aid of our paste the instrument to be sharpened can be provided with a fine cutting-edge in a comparatively short time, even if said edge should be very dull before the operation of sharpening, and our paste is of great utility for barbers, surgeons, and also for everybody who undertakes to shave himself.

We claim as new and desire to secure by Letters Patent—

A paste made of the ingredients herein specified, with or without neat's-foot oil, substantially as set forth.

The above specification of our invention signed by us this 8th day of September, 1865.

FRANK B. ATWOOD.
    ABRAHAM ELSTON.

Witnesses:
 M. M. LIVINGSTON,
 C. L. TOPLIFF.